United States Patent
Layne et al.

(10) Patent No.: US 10,438,224 B1
(45) Date of Patent: Oct. 8, 2019

(54) ENGAGEMENT CHOICE BASED MARKETING PLATFORM

(71) Applicants: Barry Layne, Boca Raton, FL (US); Eric Fritsch, Bayside, NY (US); Lloyd Glick, Upper Saddle River, NJ (US); Eric Koenig, Huntington, NY (US)

(72) Inventors: Barry Layne, Boca Raton, FL (US); Eric Fritsch, Bayside, NY (US); Lloyd Glick, Upper Saddle River, NJ (US); Eric Koenig, Huntington, NY (US)

(*) Notice: Subject to any disclaimer, the term of this patent is extended or adjusted under 35 U.S.C. 154(b) by 0 days.

(21) Appl. No.: 16/129,742

(22) Filed: Sep. 12, 2018

(51) Int. Cl.
G06Q 30/00 (2012.01)
G06Q 30/02 (2012.01)
H04N 21/258 (2011.01)

(52) U.S. Cl.
CPC ..... *G06Q 30/0224* (2013.01); *G06Q 30/0201* (2013.01); *G06Q 30/0273* (2013.01); *G06Q 30/0277* (2013.01); *H04N 21/25891* (2013.01)

(58) Field of Classification Search
None
See application file for complete search history.

(56) References Cited

U.S. PATENT DOCUMENTS

| 9,503,691 | B2 | 11/2016 | Lawrence-Apfelbaum et al. | |
| 2002/0082910 | A1* | 6/2002 | Kontogouris | G06Q 30/02 705/14.19 |
| 2004/0003398 | A1* | 1/2004 | Donian | G06F 21/10 725/34 |
| 2005/0021398 | A1* | 1/2005 | McCleskey | G06Q 30/02 705/14.47 |
| 2007/0236568 | A1* | 10/2007 | Metke | H04W 4/50 348/143 |
| 2007/0256005 | A1* | 11/2007 | Schneider | G06F 17/2235 |
| 2007/0282893 | A1* | 12/2007 | Smith | G06F 16/44 |
| 2008/0204449 | A1* | 8/2008 | Dawson | G06Q 30/02 345/419 |
| 2009/0106096 | A1 | 4/2009 | Horowitz | |
| 2009/0320059 | A1 | 12/2009 | Bolyukh | |
| 2010/0064221 | A1* | 3/2010 | White | G09G 5/14 715/719 |
| 2011/0119133 | A1* | 5/2011 | Igelman | G06Q 30/0261 705/14.58 |
| 2012/0116840 | A1 | 5/2012 | Omer | |
| 2013/0151332 | A1* | 6/2013 | Yan | G06Q 30/0243 705/14.42 |

(Continued)

*Primary Examiner* — Matthew T Sittner
(74) *Attorney, Agent, or Firm* — Georgiy L. Khayet

(57) ABSTRACT

A marketing platform and corresponding methods for providing incentive offers to customers are provided. An example method may commence with streaming content to a customer. The content may be provided by a content provider. The method may continue with rendering an incentive offer based on customer data in response to an access of the content by the customer via a customer device. The incentive offer may be provided by a marketer. The incentive offer may be associated with a plurality of choices designed to entice the customer to review the incentive offer in exchange for discounted or free access to the content. The method may further include receiving, from the customer, a selection of at least one of the plurality of choices. The method may continue with modifying the customer data based on the selection. Future incentive offers may be based on the modified customer data.

17 Claims, 5 Drawing Sheets

(56) References Cited

U.S. PATENT DOCUMENTS

| | | | |
|---|---|---|---|
| 2014/0325541 A1* | 10/2014 | Hannes | H04N 21/632 |
| | | | 725/14 |
| 2015/0026715 A1 | 1/2015 | Bernstein et al. | |
| 2015/0149284 A1* | 5/2015 | Williams | G06Q 30/0268 |
| | | | 705/14.56 |
| 2016/0127783 A1* | 5/2016 | Garcia Navarro | |
| | | | H04N 21/4668 |
| | | | 725/34 |
| 2016/0171525 A1 | 6/2016 | Ezra et al. | |
| 2016/0253710 A1* | 9/2016 | Publicover | H04W 4/21 |
| | | | 705/14.66 |
| 2017/0264935 A1 | 9/2017 | Pizzurro et al. | |
| 2018/0211279 A1 | 7/2018 | Roundtree et al. | |

\* cited by examiner

US 10,438,224 B1

ENGAGEMENT CHOICE BASED MARKETING PLATFORM

TECHNICAL FIELD

The present disclosure relates generally to data processing and, more particularly, to a marketing platform for providing incentive offers to customers.

BACKGROUND

Conventionally, a user's browsing history is used for promotions by advertising previously viewed items even if the user is not actively shopping for these items. These items are typically provided through a webpage or an application running on a user device via pop-ups, banners, and the like. There is no simple way to turn off the browsing history-based customization of the advertisements without completely disabling an association between a profiled website usage history and displayed advertisements. This results in random advertisements which are of little use to the user.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present disclosure is directed to a computer-implemented marketing platform and corresponding methods for providing incentive offers to customers. In some example embodiments of the disclosure, a marketing platform may include a content module configured to stream content to a customer. The content may be provided by a content provider. The marketing platform may include a rendering module configured to render an incentive offer based on customer data in response to an access of the content by the customer via a customer device. The incentive offer may be provided by a marketer and associated with a plurality of choices. The marketing platform may further include a communication module configured to receive, from the customer, a selection of at least one of the plurality of choices. The marketing platform may further include a data collection module configured to modify the customer data based on the selection. Future incentive offers may be based on the modified customer data.

In some example embodiments, a method for providing incentive offers to customers may commence with streaming content to a customer. The content may be provided by a content provider. The method may render an incentive offer based on customer data in response to an access of the content by the customer via a customer device. The incentive offer may be provided by a marketer and associated with a plurality of choices. The method may further include receiving, from the customer, a selection of at least one of the plurality of choices. The method may modify the customer data based on the selection. Future incentive offers may be based on the modified customer data.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements and, in which.

DETAILED DESCRIPTION

Figure 1:
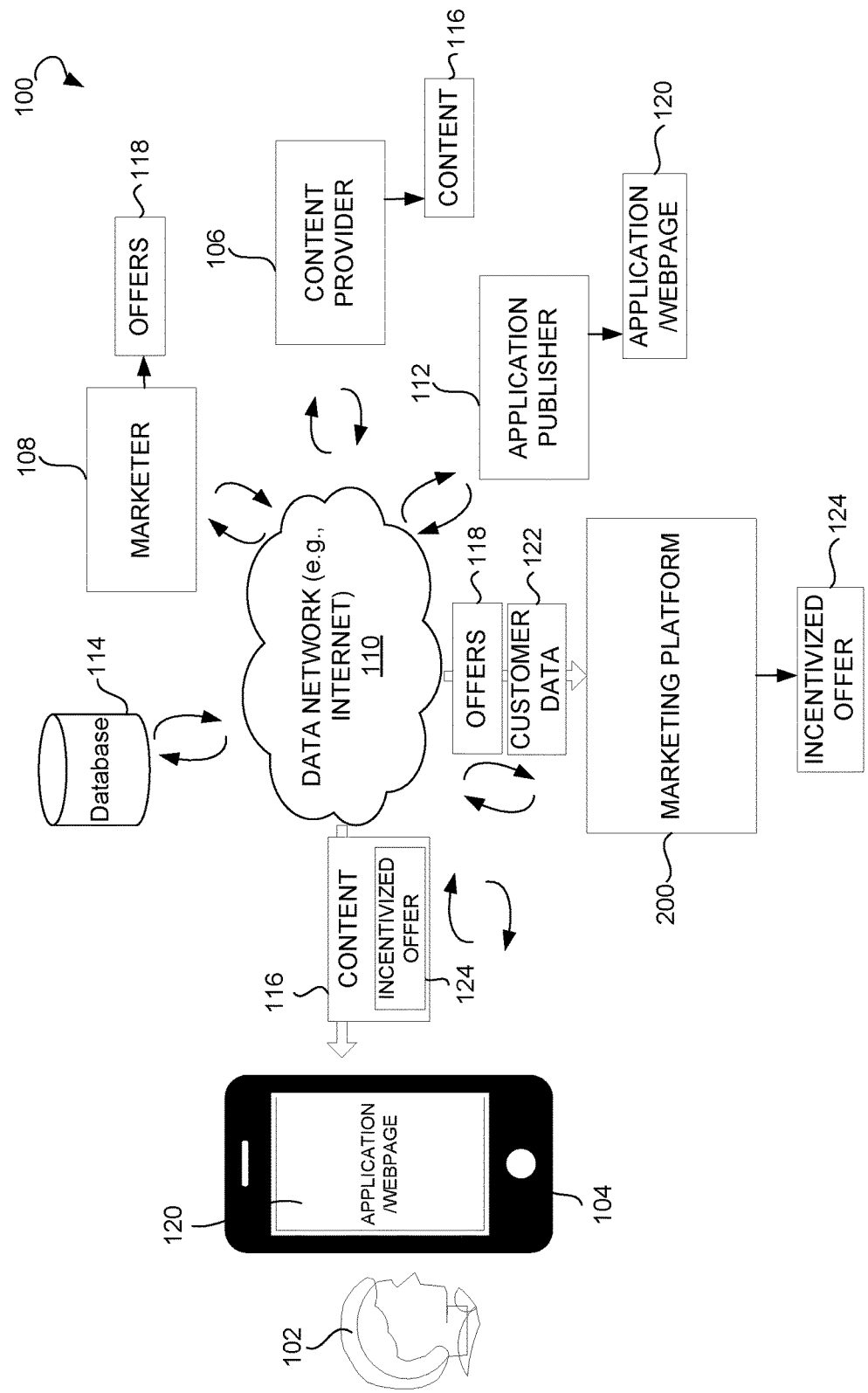
FIG. 1 illustrates an environment within which a marketing platform and corresponding methods for providing incentive offers to customers can be implemented, in accordance with some example embodiments.

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

The present disclosure is directed to marketing platform and corresponding methods for providing incentive offers with engaging choices to customers. The marketing platform is also referred herein to as a multifaceted platform that provides benefits for a variety of participants that utilize the platform. The participants may include at least a customer, a content provider, a marketer, and an application publisher. The customer may include a user that utilizes the platform via a customer device, such as a smartphone, a tablet, a smart TV, and the like to review content in applications and/or on websites. A content provider may include a third party that distributes content, such as TV, films, music, music videos, internet media, news, and sports, through applications and/or websites. The marketer may include one of an advertiser, a product manufacturer, a seller, a sponsor, and so forth that provides offers in the form of coupons and sales promotions to prospective customers. The application publisher may include an entity (an individual or a company) that is a producer or an owner of software applications, also referred herein to as applications, for customer devices and/or a developer or owner of websites that can be viewed via web browsers of the customer devices.

The platform may stream content of the content provider to a customer device. The platform may have access to customer data. The customer data may be received by the platform from the customer and include a name, a gender, a date of birth, an address, favorite content formats, favorite genres of content, favorite brands and products. These data can be entered by the customer in the course of a registration with the platform. Additionally, the customer data may include data collected by the platform while interacting with the customer or obtained from other sources, such as prior purchase history, application usage history, prior buying history of the customer, and the like.

The platform may have access to offers provided by marketers in order to advertise and sell products to customers. The platform may select, from the offers provided by marketers, incentive offers for the customer based on the customer data such that only offers relevant to the customer are provided.

The platform may render content and an incentive offer via a customer device. The incentive offer may be associated with a plurality of choices. Specifically, when the customer selects the incentive offer, a few offer choices may be presented to the customer, for example, in the form of clickable text or a hyperlink button. The choices may offer the customer various ways of interacting with the product or service associated with the incentive offer. The customer may select a particular choice to receive an immediate access to the incentive offer, skip the incentive offer, express an intent to access the incentive offer at a later time, and the like.

For example, on content access, a user can be presented with an offer and asked to "Get It Now", "Skip", or "Get It Later". Based on the selected option, the system can adjust and modify user's profile using Artificial Intelligence, adaptive logic, machine learning, and so forth to adjust and modify that user's profile. For example, if the user were to "Skip" a certain type of offer X amount of times, they would no longer receive offers of that nature, whereas if they continue to select "Get It Now", they would be shown more of those offers.

It should be noted that the platform and methods described herein provide a novel process wherein consumers are enticed to look at the offers in exchange for access to discounted or free content.

The platform may receive the selection of the choice of the customer and modify the customer data based on the selection. For example, the selection of the choice related to the incentive offer may be stored in a database and used for selection of future incentive offers for the customer. Thus, the platform of the present disclosure may serve as a monetization platform for the content providers and the application publishers and enable the content providers and the application publishers to receive income from offers presented via applications or websites in the form of advertisements. The content providers may use the platform to distribute the content more broadly and receive revenue for advertising at higher rates than the revenue received in a conventional Cost Per Mille (CPM) revenue environment, where CPM is an amount advertisers pay for one thousand impressions on a given website.

The marketers may use the platform as an engagement and connection platform that provides consumer visibility and engagement with offers, as well as attracting customers to products or services advertised by the marketers in the offers. Furthermore, the consumers who no longer wish to be overwhelmed by unnecessary or irrelevant advertisements or notification can receive offers specifically tailored to their interests and preferences.

FIG. 1 illustrates an environment 100 within which marketing platforms and methods for providing incentive offers to customers can be implemented, in accordance with some embodiments. The environment 100 may include a customer 102, a customer device 104, a marketing platform 200 (also referred to as a platform 200), a content provider 106, a marketer 108, a data network 110 (e.g., the Internet or a computing cloud), an application publisher 112, and a database 114. The client device 104, the platform 200, and the content provider 106, the marketer 108, and the application publisher 112 may be connected via the data network 110. The customer 102 may be associated with the customer device 104. The customer device 104 may include a smartphone, a tablet, a smart TV, and any other digital device.

The data network 110 may include a computing cloud, the Internet, or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The data network can further include or interface with any one or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking.

The content provider 106 may provide content 116 to be displayed to the customer 102 using the customer device 104. The content 116 may include TV, films, music, music videos, internet media, news, sports, and the like. The marketer 108 may provide offers 118 to prompt the customer 102 to buy products or services. The application publisher 112 may be a producer of an application/webpage 120. The application/webpage 120 may be running on the customer device 104 upon downloading and installing the application or opening the webpage in a web browser of the customer device 104.

The platform 200 may have access to customer data 122. In an example embodiment, the customer data 122 may be provided by the customer, collected by the platform 200, retrieved from a database 114, received from third-party sources, and the like. The platform 200 may further have access to offers 118 provided by the marketer 108 for displaying to customers. The platform 200 may select, from the offers 118, an incentivized offer 124. The selection of the incentivized offer 124 may be performed based on the customer data 122. The platform 200 may provide the incentivized offer 124 to the customer device 104. The incentivized offer 124 may be displayed to the customer 102 together with the content 116 provided by the content provider 106. The content 116 and the incentivized offer 124 may be shown to the customer 102 on the application/webpage 120 displayed on the customer device 104.

Figure 2:
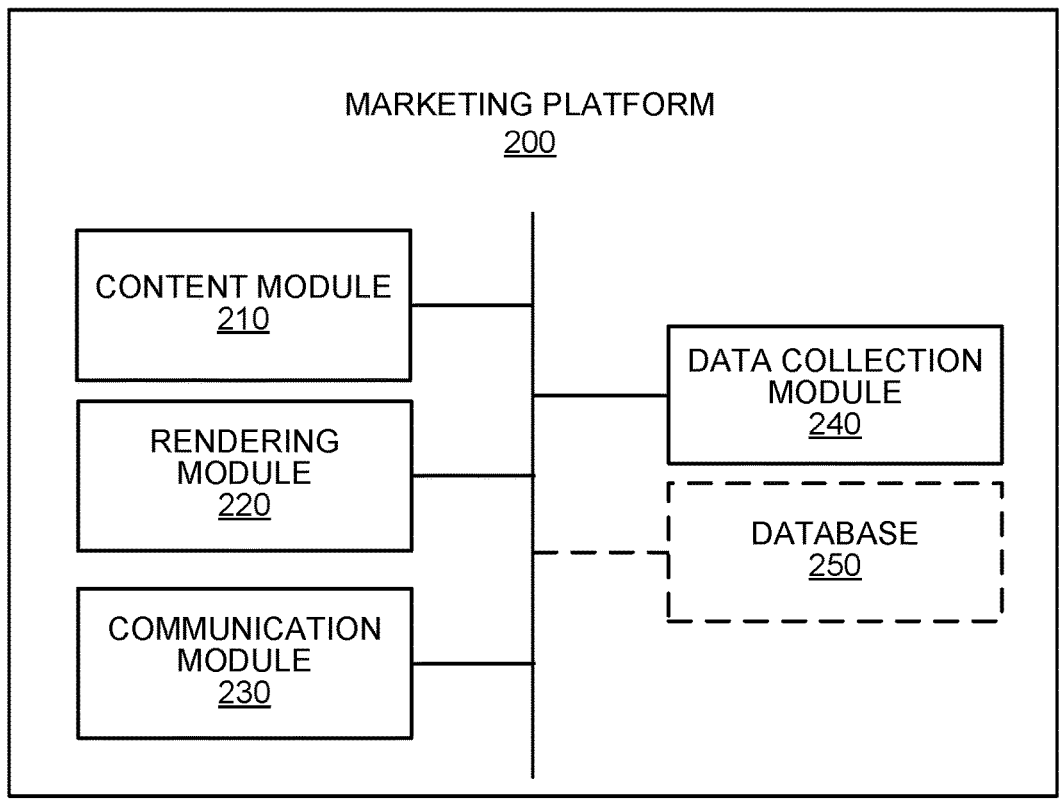
FIG. 2 is a block diagram showing various modules of an example marketing platform, in accordance with certain embodiments.

FIG. 2 is a block diagram showing various modules of a marketing platform 200, in accordance with certain embodiments. The platform 200 may include a content module 210, a rendering module 220, a communication module 230, a data collection module 240, and, optionally, a database 250. The database 250 may include computer-readable instructions for execution by each of the content module 210, the rendering module 220, the communication module 230, and the data collection module 240. Each of the content module 210, the rendering module 220, the communication module 230, and the data collection module 240 may include a programmable processor, such as a microcontroller, central processing unit (CPU), and so forth. In other embodiments, each of the content module 210, the rendering module 220, the communication module 230, and the data collection module 240 may include an application-specific integrated circuit or programmable logic array, such as a field programmable gate array, designed to implement the functions performed by the platform 200. In various embodiments, the platform 200 may be installed on a customer device or may be provided as a cloud service residing in a cloud storage.

In an example embodiment, the data collection module 240 may be configured to receive device identification data from a customer device. The data collection module 240 may identify the customer device based on the device identification data and associate an application running on the customer device with a customer. The data collection module 240 may log the customer into the application based on the identification of the customer device. The application may be produced by an application publisher and include an information application, an entertainment application, and the like. In an example embodiment, the customer device may be configured to run an application for rendering the incentive offer. The customer device can include one of the following: a smartphone, a tablet, a smart TV, a smartwatch, smartglasses, and so forth.

The content module 210 can be configured to stream content to the customer. The content may be provided to the content module 210 by a content provider. In an example embodiment, the content can be provided by a third party.

The rendering module 220 may be configured to render an incentive offer based on customer data in response to access of the content by the customer via the customer device. The incentive offer may be provided by a marketer and include coupons and sales promotions related to products and services. In an example embodiment, the data collection module uses Artificial Intelligence (AI) algorithms to score available offers provided by the marketer and select the incentive offer to be recommended to the customer. Specifically, the scoring and recommending may be performed based on the consumer data.

The incentive offer may be associated with a plurality of choices. In an example embodiment, the plurality of choices may include one of the following: an immediate access to the incentive offer, skipping the incentive offer, an intent to access the incentive offer at a later time, and so forth. The rendering module 220 can be further configured to present the customer with an incentive offer upon selection of the immediate access by the customer.

In an example embodiment, the customer data may include psychographic information concerning the customer, demographic information concerning the customer, and the like. The psychographic information may include prior purchase history and application usage history by the customer. In an example embodiment, the data collection module 240 may save customer activities associated with the customer device, the application, promotional offers, and the like to the database 250. The demographic information may include a name, a gender, a date of birth, an address, a phone number, an email, content interests, such as favorite formats and genres of the content, product interests, such as favorite brands and products, and marketing interests, such as preferred contact methods and media formats of the customer. At least a portion of the customer data may be provided to the platform 200 by the consumer upon registration with the platform 200 via a dialog system, e.g., by using natural language processing. For example, the data collection module 240 may prompt the customer to register with the platform 200 and provide, during the registration process, at least a portion of the customer data via the application or a website rendered on a web browser of the customer device.

In example embodiments, the data collection module 240 can use a classification system and prompt the customer to select classification options of the content the customer wants to consume, for example, select one or more of topics, subjects, brands, categories, formats, and genres associated with the content. In further example embodiments, the data collection module 240 may receive at least a portion of the customer data from the customer by obtaining access to social network data of the customer. The data obtained from social networks may include a name, a gender, a date of birth, an address, a phone number, an email, content interests, product interests, and market interests.

The communication module 230 may be configured to receive, from the customer, a selection of at least one of the plurality of choices associated with the incentive offer. The data collection module may be configured to modify the customer data based on the selection made by the customer. The selection of future incentive offers for the customer may be based on the modified customer data.

In an example embodiment, the data collection module 240 may be further configured to receive a payment from the marketer for rendering the incentive offer to the customer. The payment received from the marketer may be used to pay the content provider that provided the content or to pay the application publisher that produced the application. The data collection module 240 may further allocate payments collected from the marketer between the content provider and the application publisher.

Figure 3:
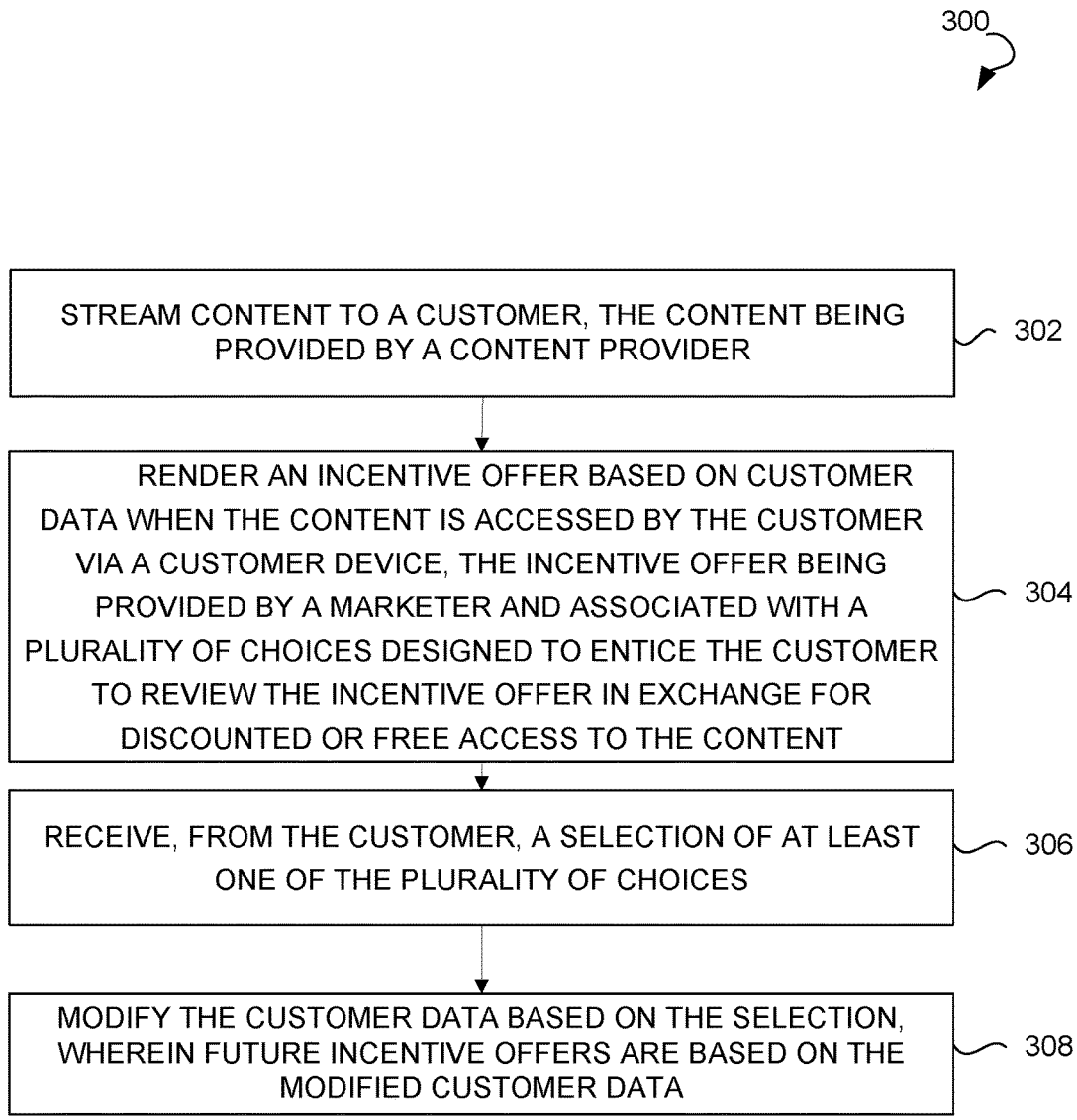
FIG. 3 is a flow chart illustrating a method for providing incentive offers to customers, in accordance with an example embodiment.

FIG. 3 is a flow chart illustrating a method 300 for providing incentive offers to customers, in accordance with an example embodiment. In some embodiments, the operations may be combined, performed in parallel, or performed in a different order. The method 300 may also include additional or fewer operations than those illustrated. The method 300 may be performed by processing logic that comprises hardware (e.g., decision making logic, dedicated logic, programmable logic, and microcode), software (such as software run on a general-purpose computer system or a dedicated machine), or a combination of both.

The method 300 may optionally include receiving device identification data associated with a customer device. Based on the device identification data, the customer device may be identified. The method 300 may optionally include associating an application running on the customer device with a customer of the customer device based on the identification of the customer device. The method 300 may then continue with logging the customer into the application based on the identification of the customer device. The method 300 may further optionally include prompting the customer to register with a marketing platform and provide at least a portion of the customer data to the marketing platform. In an example embodiment, at least a portion of the customer data may be received from the customer by obtaining access to a social network data of the customer. In this embodiment, the customer data obtained from social networks can include a name, a gender, a date of birth, an address, a phone number, an email, content interests, product interests, and market interests of the customer. Additionally, when the customer is logged into the platform, the customer can be prompted to select one or more of topics, subjects, brands, categories, formats, and genres associated with a content preferred by the customer.

The method 300 may include streaming, by a content module, content to the customer device of the customer at operation 302. The content may be provided by a content provider. The method 300 may then continue with rendering, by a rendering module, an incentive offer based on customer data at operation 304. The rendering may be performed in response to access of the content by the customer via a customer device. The incentive offer may be provided by a marketer. The incentive offer may be associated with a plurality of choices.

In an example embodiment, the method 300 may include using AI algorithms to score one or more incentive offers and recommend an incentive offer to the customer based on the consumer data by providing the incentive offer along with the content to the customer.

The method 300 may further include receiving, by a communication module, from the customer, a selection of at least one of the plurality of choices, at operation 306. The method 300 may then continue with modifying, by a data collection module, the customer data at operation 308. The customer data may be modified based on the selection of the at least one of the plurality of choices made by the customer. Future incentive offers selected for display to the customer may be selected based on the modified customer data. The method 300 may optionally include saving customer activities, such application activities or customer device activities, to a database. The modified customer data may be further modified based on the customer activities.

The method 300 may optionally include receiving a payment from the marketer for rendering the incentive offer. The payment may be used to pay the content provider or an application publisher. Alternatively, the payment collected from the marketer may be allocated between the content provider and the application publisher.

Figure 4:
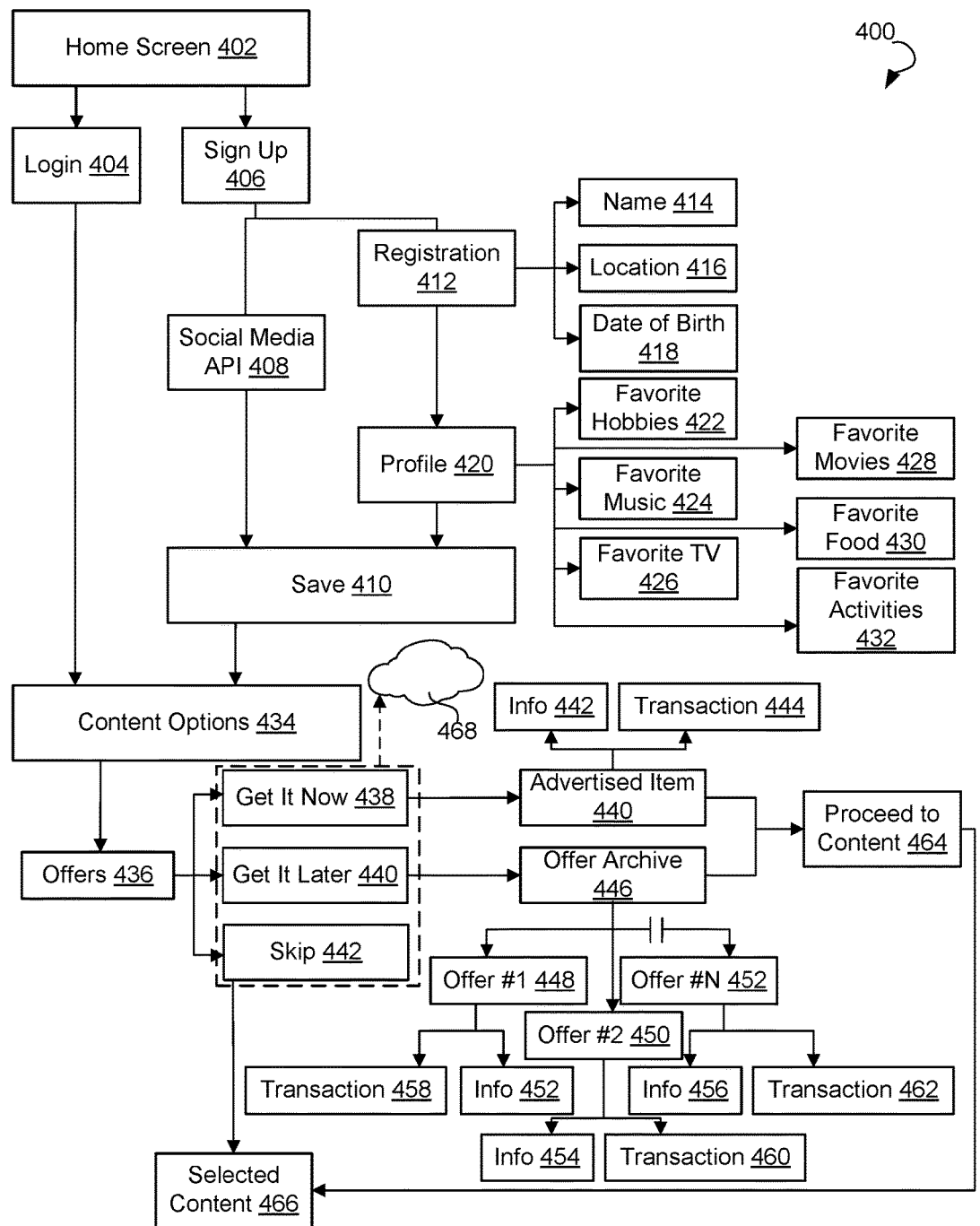
FIG. 4 is a block diagram illustrating actions performed by a marketing platform to provide incentive offers with engagement choices to a customer, in accordance with an example embodiment.

FIG. 4 is a block diagram 400 illustrating actions performed by a marketing platform to provide incentive offers with engagement choices to a customer, in accordance with an example embodiment. The process of registration with the marketing platform for consumers, marketers, and content providers may be a web-based process. In an example embodiment, the consumer registration process can be driven via a HyperText Markup Language, version 5 (HTML5) or a native application to enable simple registration and ongoing communication with the customer.

The marketing platform can be embedded into third party website or applications. The customer may be able to access the marketing platform in one of the following ways: by downloading an application to a customer device, by engaging with an existing application that is embedded in the marketing platform, or by being informed about the application through marketing and promotions and driven to a website for registering with the marketing platform.

When the customer visits the website in order to register with the marketing platform, or learn more about the marketing platform and then register, a home screen of the website as shown by block 402 on FIG. 4 may be provided to the customer. There may be various calls to action on the website. In an example embodiment, the customer may log into the marketing platform as an existing user if the customer is already registered with the marketing platform, as shown by block 404. Alternatively, if the customer is not registered, the customer may sign up as a new user as shown by block 406. The sign up may be performed in several ways. In one example embodiment, a social media application programming interface may be used to enable the customer to sign up using social network data of the customer, as shown by block 408. Specifically, the customer may provide data related to a customer account in social networks, such as Facebook, Google, LinkedIn, Instagram, and the like. Customer data from the customer account in a social network can be stored to a profile of the customer on the marketing platform. The customer data may be saved to a database as shown by block 410.

In another example embodiment, the customer may go through the registration process to register with the marketing platform as shown by block 412. Specifically, the customer may provide customer data, such as a name 414, a location 416 of the customer, a data of birth 418, and the like. Furthermore, the customer may be prompted to provide additional data to be added to a profile 420 of the customer. The customer may provide data on content interests, such as favorite hobbies 422, favorite music 424, favorite TV 426, favorite movies 428, favorite food 430, favorite activities 432, as well as product interests, such as favorite brands and products, and marketing interests, such as preferred contact methods and media formats. The registration process may continue with prompting the customer to make selections related to favorite TV 426, favorite movies 428, or other categories selected by the customer. For example, the customer may be prompted to select topics the customer enjoys watching online, such as live sports, stand-up comedy, action movies, and so forth. Therefore, if the customer selects 'sports' as customer interests, the content relating to live coverage or highlights, specific team news, documentaries related to sports, and movies related to sports (which may qualify for tagging in both 'sports' and 'movies' categories selected by the customer) may be provided to the customer.

As the customer proceeds through the registration process, contact can be maintained with the customer through a preferred customer contact method. Furthermore, the customer may be continuously incentivized, e.g., by using branded or sponsored offers, to refine the registration and provide more profiled and personalized data. The data associated with the profile 420 may be saved to a database, as shown by block 410.

The marketing platform may apply an "operant conditioning" approach according to which the likelihood of performing a certain function is increased depending on the perceived value or importance of the associated contingency or reward to an individual. This approach may be applied with regard to incentive offers suggested to each customer in order to motivate the customers to complete the registration process by providing as many details as possible, in order to obtain as much information as possible from the customer. This approach may be also applied throughout the user experience, i.e. during the continued use of the marketing platform by the customer, to hold the attention of the customer. In all instances, this approach is used for the purposes of data mining. For example, a customer may not be inclined to complete the registration in order to receive 5% off, but the customer may be inclined to do so in order to receive 15% off the same product; the customer may not be motivated to complete the registration for 5% off one product, but the customer may be willing to do so for 5% off a different product that better matches the profiled interests of the customer or grabs attention of the customer. In other words, one of the objectives of the marketing platform may be to get each customer to register by offering entertaining, incentivized, and engaging offers to the customers, with the end goal of performing data mining with regard to each registered customer.

Once the customer has registered and the marketing platform has captured the information from the customer, the customer may be provided with a dashboard of content options 434. As the user goes through content selection of the content options 434, virtual menu accordions may open and the customer may be able to make more specific choices. For example, the customer may select 'Politics' and then select 'CNN', or select 'CNN' and then select 'Politics.' The preferred classification used by the marketing platform may be "one search, multiple results" or "N searches, N results."

A plurality of offers may be received from marketers, for example, a regional sponsor/source, a national marketer, a worldwide marketer, and the like. Therefore, a plurality of options related to the content may exist. The customer may be enabled to select different topics, subjects, brands, and categories of the content through a comprehensive categorization and classification (e.g., the science and technique may be classified into categories, sub-categories, and so forth).

In an example embodiment, the marketing platform may operate using an accordion model of capturing information, or funnel, through which more refined specifics may be captured. The accordion model may include a graphical control element comprising a stacked list of items. Each item can be "expanded" or "stretched" to reveal the content associated with the item. For example, the customer may be asked "What kind of content do you want?" The content format options may include TV, film, music, music videos, internet media, news, sports, and the like. Once the customer chooses a content format, the customer may have options to select a genre by replying to the marketing platform as follows: "I want to see videos about sports. How about football? The NY Giants."

Upon selection one of the content options 434 (e.g., the customer selects a type of content to view and/or interact with), offers 436 that match the profiled and personalized data of the customer may be presented to the customer. The offers 436 may be associated with the content the customer desires and/or for which the customer is looking. Therefore, the marketing platform may be driven by the offers 436 presented to consumers, e.g., in the form of coupons and sales promotions, and the consumer may engage with the offers 436 to access the desired content. The offers 436 may be selected specifically for each customer based on a psychographic and demographic profile of the customer.

Each offer 436 may provide a plurality of choices. The customer may need to select one of choices to view the selected content. Specifically, when the customer clicks on the offers 436, the customer may be presented with several offer choices via clickable text or a hyperlink button. The choices may include "Get It Now" choice 438 which, upon clicking on it by the customer, may initiate a connection to a web browser in order to provide an advertised item 440 to the customer, specifically, to provide information 442 on the item, transaction information 444, as well as offer rules, a promotional value, an expiration date of the offer, a promotional code, and the like.

The choices may further include "Get It Later" choice 440, which may indicate to the marketing platform that the customer found the offer interesting, but does not wants the review the content at the moment. The "Get It Later" choice 440 may initiate communication to the customer by providing information about the offer and a direct link to that offer through the preferred method of contact that the customer selected during the registration (for example, by either email or text message). Thereafter, the customer may redeem the offer as long as the offer is valid. In addition, the offer maybe saved to an offer archive 446 so that the customer can redeem the offer at a later time as long as the offer is still valid. The offer archive 446 may store a plurality of offers, such as offers 448, 450, 452, information 452, 454, 456 related to the offers 448, 450, 452, and transaction information 458, 460, 462 related to the offers 448, 450, 452. Archived offers can be searched by the customer later and may be filtered by date, alphabetically, by subject, or the like.

Upon providing the advertised item 440 or upon storing the offer to the offer archive 446, the marketing platform may proceed to providing the content to the customer, as shown by block 464. The selected content 466 may be displayed to the customer.

The choices may further include "Skip" choice 442, which means that the customer has no interest in the offer and wants to view the selected content. In case of selection of the "Skip" choice 442 by the customer, the marketing platform may proceed to providing the selected content 466 to the customer.

All customer interactions with offers (skip a particular offer, accept a particular offer, redeem an offer on a particular day, redeem an offer for a particular amount of money) may be tracked and stored by the marketing platform in a cloud 468. The marketing platform may utilize this collected data to optimize the personal experience of each customer within the marketing platform by learning which offers each customer accepts, saves, or rejects and adjusting future offers to match the customer data accordingly.

The marketing platform may constantly monitor the identification data associated with customer devices so that if the customer utilizes any of the applications embedded with/ running the marketing platform, the customer may be automatically logged in to the application.

The consumer that engages with the content from content providers, applications from application publishers, and offers from marketers may be a targeted end user of the marketing platform. Every registered consumer can be centrally monitored so that a centralized user database of the marketing platform may become a customer relationship management system. One of the key functions of the marketing platform may include logging all activities of customer, with every keystroke being considered an activity and every activity being logged.

In an example embodiment, each customer may receive notifications from the marketing platform. The notifications may outline activity of the customer: offers the customer skipped, offers the customer accepted, registration data, changes made in the profile by the customer, and the like. Every time the customer performs some activity, the notification can be sent to the customer. The notifications may be sent in the form of a 'transactional email' that means that the identification (ID) data of the customer may be residing in the background of the notification so that when the customer clicks a button in the notification, the customer may be forwarded directly to the profile of the customer on the marketing platform. The directing of the customer may be the equivalent of a forced search. The marketing platform may send other emails or text updates to the customer to inform the customer about additional functionality and more opportunities for engaging and incentivized choices (e.g., to drive the customer to a website in order to make a purchase).

The marketing platform may utilize a revenue model designed to charge marketers on a cost per engagement (instead of a cost per impression). As the classification data become more specific (i.e., as the preferences or desire of the consumer become more defined), the rate for engagement may go up proportionately as the promotions become more targeted (i.e., tailored to profiled data of each customer).

The marketing platform may create an alternative revenue model for application publishers and content providers, so that the application publishers and content providers can receive higher than their standard revenue. The marketing platform may further utilize an incremental revenue model, where in addition to the standard revenue (for example, derived from subscriptions), specific heightened-value content may be made available to customers. The heightened-value content can be placed behind an equivalent of a paywall requiring the customer to pay in order to access the premium content.

In an example embodiment, the application publishers may be paid an allocated 50 cents of every dollar generated by engagements within the applications of the application publishers. If the application publishers provide the content, the application publishers may keep all 50 cents on the dollar. If the application publishers choose to use content that is acquired from third party content providers, then, approximately 20 cents out of 50 cents on the dollar may go to the content provider and 30 cents may stay with the application publishers. By contrast, video content providers, on average, receive between 1 and 2 cents per play. The revenue model used by the marketing platform may offer about 8 to 10 times greater amount to the video content providers.

This increase in revenue may be triggered by the deeper mining of consumer data, i.e., by the incentivized requests for more profiled data during the registration. The marketer can be charged more because the quality of the engagement is increased. The revenue model may allow for profit to be made by the delta between the money received from marketers and the money paid to application publishers.

The marketing platform may also segment the offers for geographic targeting. Application publishers can target application monetization to certain geographic areas. Marketers can have unlimited targeting: country, state, city, a zip code, and so forth.

The marketing platform addresses and answers marketing goals and demands by taking consumer behavior and preferences into consideration. The marketing platform is engagement-based and may charge marketers only when self-identified, intent-based consumers engage with offers of the marketers. Additionally, the marketing platform can be integrated into applications and remain connected to existing user flows and brand identity of the application publishers, thereby further enhancing consumer relationship for the application publishers.

The customers may be provided with fewer advertisements, but may receive offers that actually match interests and preferences of the customers with regard to products, categories, brands, and the like. This may be accomplished by analyzing available offers using the AI algorithms by applying scoring and recommendation to select offers that match interests and preferences of the customers. Additionally, the AI algorithms may match the customer data with data on preferred target customers of the marketers to which the marketers may want to provide offers. Therefore, the marketers may reach and engage with most-valuable consumers.

Therefore, by utilizing the marketing platform, the marketers may pay for engagement, but not for thousands of impressions, because the customers may choose and determine what the customers want to see and offers of no interest may not be shown to the customers. The application publishers may get better deals with more revenue, more engagement, and more returns. The content providers may get a distribution platform and a revenue share model.

Figure 5:
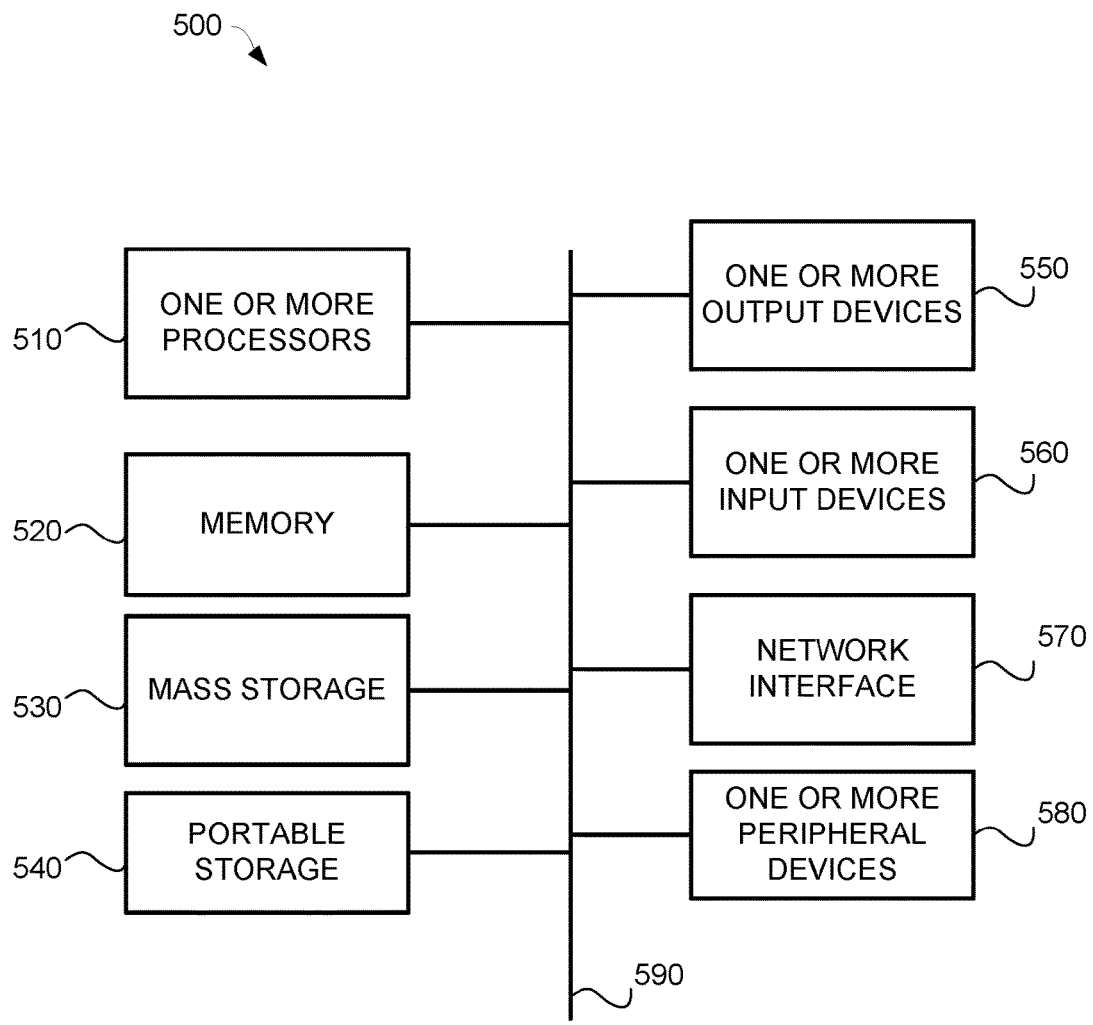
FIG. 5 shows a computing system that can be used to implement a method for providing incentive offers to customers, according to an example embodiment.

FIG. 5 illustrates an exemplary computing system 500 that may be used to implement embodiments described herein. The exemplary computing system 500 of FIG. 5 may include one or more processors 510 and memory 520. Memory 520 may store, in part, instructions and data for execution by the one or more processors 510. Memory 520 can store the executable code when the exemplary computing system 500 is in operation. The exemplary computing system 500 of FIG. 5 may further include a mass storage 530, portable storage 540, one or more output devices 550, one or more input devices 560, a network interface 570, and one or more peripheral devices 580.

The components shown in FIG. 5 are depicted as being connected via a single bus 590. The components may be connected through one or more data transport means. The one or more processors 510 and memory 520 may be connected via a local microprocessor bus, and the mass storage 530, one or more peripheral devices 580, portable storage 540, and network interface 570 may be connected via one or more input/output buses.

Mass storage 530, which may be implemented with a magnetic disk drive or an optical disk drive, is a non-volatile storage device for storing data and instructions for use by a magnetic disk or an optical disk drive, which in turn may be used by one or more processors 510. Mass storage 530 can store the system software for implementing embodiments described herein for purposes of loading that software into memory 520.

Portable storage 540 may operate in conjunction with a portable non-volatile storage medium, such as a compact disk (CD) or digital video disc (DVD), to input and output data and code to and from the computing system 500 of FIG. 5. The system software for implementing embodiments described herein may be stored on such a portable medium and input to the computing system 500 via the portable storage 540.

One or more input devices 560 provide a portion of a user interface. The one or more input devices 560 may include an alphanumeric keypad, such as a keyboard, for inputting alphanumeric and other information, or a pointing device, such as a mouse, a trackball, a stylus, or cursor direction keys. Additionally, the computing system 500 as shown in FIG. 5 includes one or more output devices 550. Suitable one or more output devices 550 include speakers, printers, network interfaces, and monitors.

Network interface 570 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth radio, and an IEEE 802.11-based radio frequency network, among others. Network interface 570 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 580 may include any type of computer support device to add additional functionality to the computing system. The one or more peripheral devices 580 may include a modem or a router.

The components contained in the exemplary computing system 500 of FIG. 5 are those typically found in computing systems that may be suitable for use with embodiments described herein and are intended to represent a broad category of such computer components that are well known in the art. Thus, the exemplary computing system 500 of FIG. 5 can be a personal computer, hand held computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Thus, a marketing platforms and corresponding methods for providing incentive offers to customers are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A marketing platform comprising:
 a content module comprising a first processor, wherein upon executing a first set of instructions stored in a data base, the first processor is configured to stream content to a customer, the content being provided by a content provider;
 a rendering module comprising a second processor, wherein upon executing a second set of instructions stored in the data base, the second processor is configured to render an incentive offer based on customer data in response to an access of the content by the customer via a customer device using a web site or an application, the web site or the application running on the customer device and provided by an application publisher, the incentive offer being provided by a marketer, the incentive offer being associated with a plurality of choices designed to entice the customer to review the incentive offer in exchange for discounted or free access to the content;
 a communication module comprising a third processor, wherein upon executing a third set of instructions stored in the data base, the third processor is configured to receive, from the customer, a selection of one of the plurality of choices related to the incentive offer; and
 a data collection module comprising a fourth processor, wherein upon executing a fourth set of instructions stored in the data base, the fourth processor is configured to:
  track interaction of the customer with the incentive offer and further incentive offers, the tracking including storing an association between the incentive offer and the one of the plurality of choices selected by the customer for the incentive offer and an association between the further incentive offers and further choices selected by the customer for the further incentive offers;
  based on the tracking, determine types of incentive offers with regard to which the customer selected a particular choice from the plurality of choices;
  modify the customer data based on the determination, wherein the modifying includes storing the types of incentive offers with regard to which the customer selected the particular choice for the customer data to obtain modified customer data;
  upon the selection of the one of the plurality of choices by the customer with regard to the incentive offer and the further incentive offers, store the incentive offer and the further incentive offers to an offer archive, wherein the offer archive is searchable by the customer to enable further selection of one or more of the incentive offer and the further incentive offers by the customer while the incentive offer and the further incentive offers are valid;

based on the modified customer data, selecting future incentive offers to be presented to the customer by selecting one or more incentive offers having the types stored in the modified customer data;

receive device identification data associated with the customer device; identify the customer device based on the device identification data; associate an application with the customer based on the identification of the customer device;

log the customer into the application running on the customer device based on the identification of the customer device;

receive a payment from the marketer for rendering the incentive offer to the customer on the web site or in the application on the customer device, the payment being used to pay one of the following: the content provider or an application publisher; and allocate the payment collected from the marketer between the content provider and the application publisher.

2. The marketing platform of claim 1, wherein the second processor is further configured to present the customer with the incentive offer upon selection of the immediate access.

3. The marketing platform of claim 2, wherein the second processor is further configured to present the customer with an incentive of the incentive offer upon selection of the immediate access.

4. The marketing platform of claim 1, wherein the customer device is configured to run an application for rendering the incentive offer, the customer device including one of the following: a smartphone, a tablet, and a smart TV.

5. The marketing platform of claim 4, wherein the application includes an information application or an entertainment application.

6. The marketing platform of claim 1, wherein the content provider includes a third party.

7. The marketing platform of claim 1, wherein the incentive offer includes coupons and sales promotions.

8. The marketing platform of claim 1, wherein the customer data includes at least one of psychographic information and demographic information.

9. The marketing platform of claim 8, wherein the psychographic information includes prior purchase history associated with the customer and application usage history associated with the customer.

10. The marketing platform of claim 1, wherein at least a portion of the customer data is provided by the consumer upon registration with the platform via a dialog system using natural language processing.

11. A method for providing incentive offers to customers, the method comprising:

streaming, by one or more processors, content to a customer, the content being provided by a content provider;

rendering, by the one or more processors, an incentive offer based on customer data in response to an access of the content by the customer via a customer device using a web site or an application, the web site or the application running on the customer device and provided by an application publisher, the incentive offer being provided by a marketer, the incentive offer being associated with a plurality of choices designed to entice the customer to review the incentive offer in exchange for discounted or free access to the content;

receiving, by the one or more processors, from the customer, a selection of one of the plurality of choices related to the incentive offer;

tracking, by the one or more processors, interaction of the customer with the incentive offer and further incentive offers, the tracking including storing an association between the incentive offer and the one of the plurality of choices selected by the customer for the incentive offer and an association between the further incentive offers and further choices selected by the customer for the further incentive offers;

based on the tracking, determining, by the one or more processors, types of incentive offers with regard to which the customer selected a particular choice from the plurality of choices;

modifying, by the one or more processors, the customer data based on the determination, wherein the modifying includes storing the types of incentive offers with regard to which the customer selected the particular choice for the customer data to obtain modified customer data;

upon the selection of the one of the plurality of choices by the customer with regard to the incentive offer and the further incentive offers, storing, by the one or more processors, the incentive offer and the further incentive offers to an offer archive, wherein the offer archive is searchable by the customer to enable further selection of one or more of the incentive offer and the further incentive offers by the customer while the incentive offer and the further incentive offers are valid;

based on the modified customer data, selecting, by the one or more processors, future incentive offers to be presented to the customer by selecting one or more incentive offers having the types stored in the modified customer data;

receiving, by the one or more processors, device identification data associated with the customer device;

identifying, by the one or more processors, the customer device based on the device identification data;

associating, by the one or more processors, an application with the customer based on the identification of the customer device;

logging, by the one or more processors, the customer into the application running on the customer device based on the identification of the customer device;

receiving, by the one or more processors, a payment from the marketer for rendering the incentive offer to the customer on the web site or in the application on the customer device, the payment being used to pay one of the following:

the content provider or an application publisher; and allocating, by the one or more processors, the payment collected from the marketer between the content provider and the application publisher.

12. The method of claim 11, further comprising using, by the one or more processors, Artificial Intelligence algorithms to score and recommend one or more incentive offers to the customer based on the consumer data.

13. The method of claim 11, further comprising:

receiving, by the one or more processors, device identification data associated with the customer device;

identifying, by the one or more processors, the customer device based on the device identification data;

associating, by the one or more processors, an application running on the customer device with the customer based on the identification of the customer device; and logging, by the one or more processors, the customer into the application based on the identification of the customer device.

14. The method of claim 11, further comprising prompting, by the one or more processors, the customer to select one or more of topics, subjects, brands, categories, formats, and genres using a classification system.

15. The method of claim 11, further comprising saving, by the one or more processors, customer activities to a database.

16. The method of claim 11, further comprising prompting, by the one or more processors, the customer to register with a marketing platform by providing at least a portion of the customer data via a website or an application.

17. The method of claim 11, further comprising receiving, by the one or more processors, from the customer, at least a portion of the customer data by obtaining access to a social network data, the customer data including one or more of the following: a name, a gender, a date of birth, an address, a phone number, an email, content interests, product interests, and market interests.

* * * * *